United States Patent [19]

Erazo

[11] 4,130,993
[45] Dec. 26, 1978

[54] METHOD AND APPARATUS FOR CONVERTING THERMAL ENERGY TO ROTATIONAL ENERGY

[75] Inventor: Julio N. Erazo, Cincinnati, Ohio

[73] Assignee: Ectrice, Ltd., Chicago, Ill.

[21] Appl. No.: 786,231

[22] Filed: Apr. 11, 1977

[51] Int. Cl.² .................................................. F03G 7/06
[52] U.S. Cl. ........................................ 60/721; 60/531
[58] Field of Search .................. 60/530, 643, 645, 650, 60/682, 721, 516, 531, 675

[56] References Cited

U.S. PATENT DOCUMENTS

| | | | |
|---|---|---|---|
| 2,490,064 | 12/1949 | Kollsman | 60/650 X |
| 2,597,249 | 5/1952 | Kollsman | 60/650 X |

Primary Examiner—Martin P. Schwadron
Assistant Examiner—Stephen F. Husar
Attorney, Agent, or Firm—Melville, Strasser, Foster & Hoffman

[57] ABSTRACT

A method and apparatus for converting thermal energy to rotational energy by impressing a contained fluid with a thermal gradient in the presence of a centrifugal force field.

21 Claims, 6 Drawing Figures

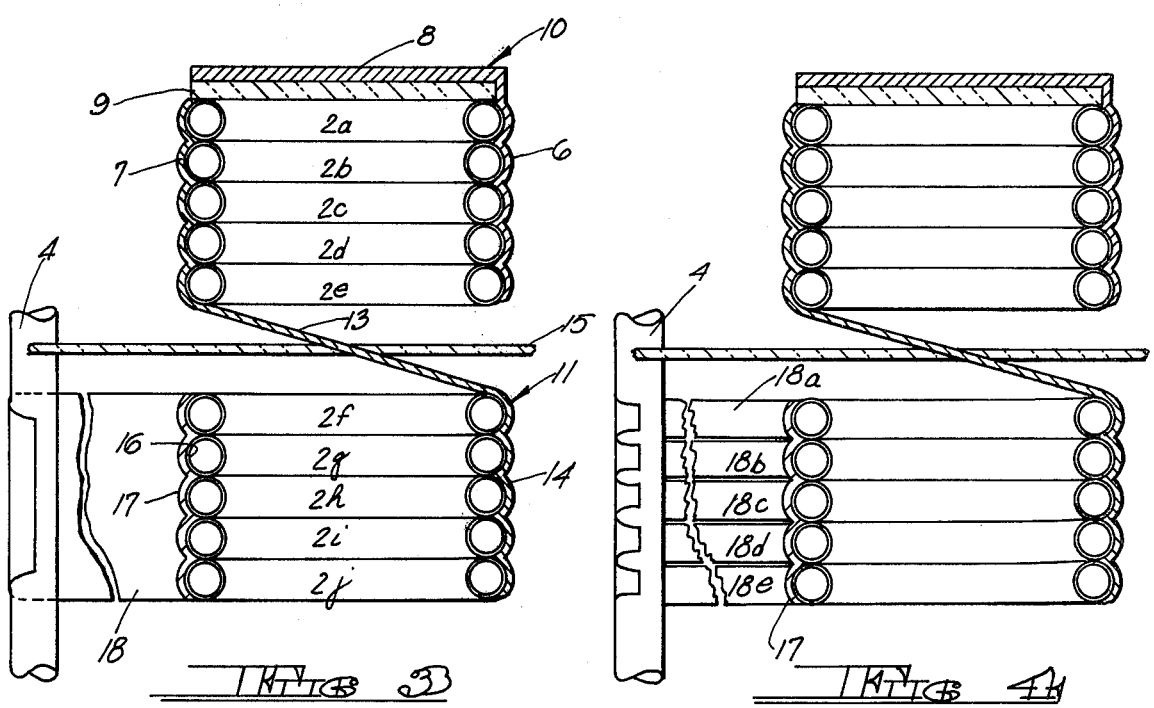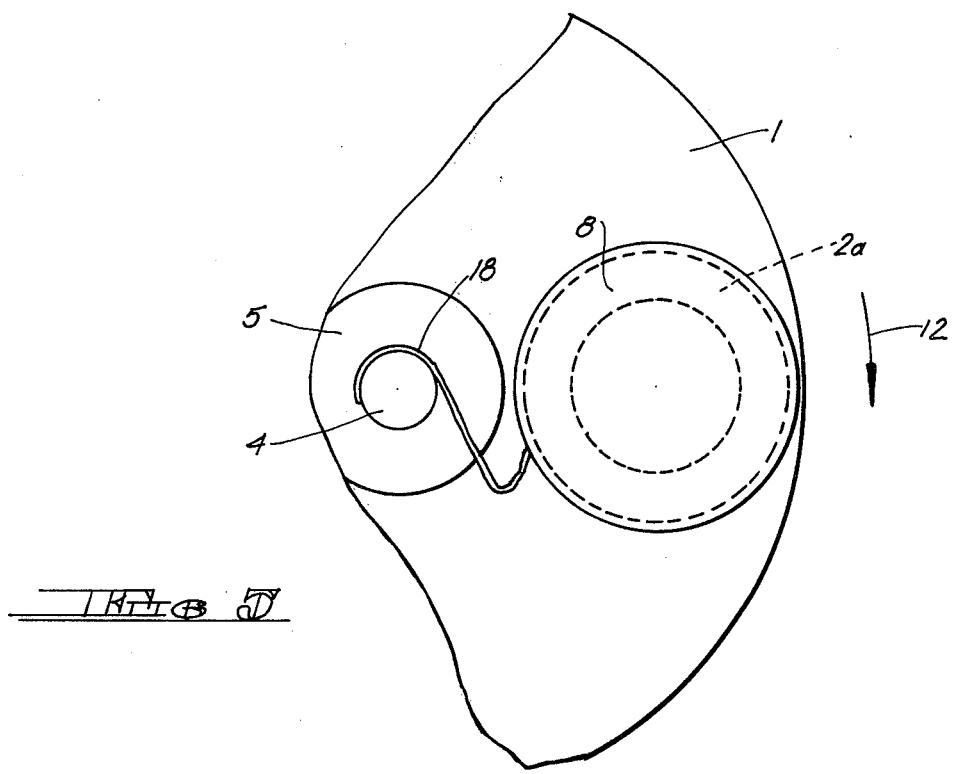

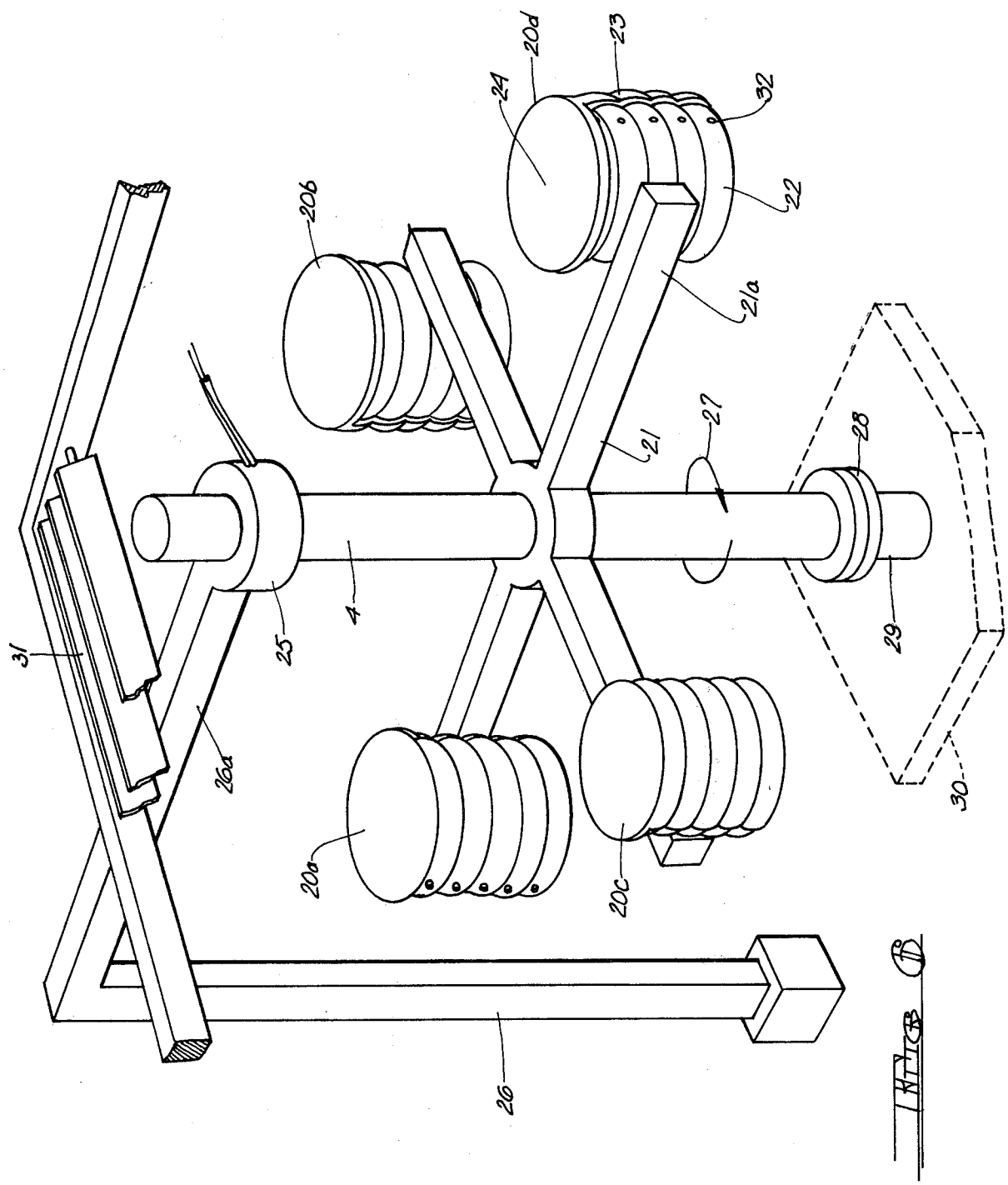

METHOD AND APPARATUS FOR CONVERTING THERMAL ENERGY TO ROTATIONAL ENERGY

BACKGROUND OF THE INVENTION

The method and apparatus of the present invention relate generally to devices for converting thermal energy to rotational energy, and more particularly to a method and apparatus for converting thermal energy to rotational energy by impressing a thermal gradient across a contained fluid in the presence of a centrifugal force field.

As the availability of naturally occurring fossil fuels decreases, society is forced to evolve new methods for extracting useful work from other naturally occuring energy sources. To this end, tremendous research has engulfed the fields of solar energy, geothermal energy, and nuclear energy. Yet none of the developments in these areas has met man's needs in a way satisfactory to all segments of society. For example, the production of nuclear energy, whether by fusion or fision processes, bears with it the menace of nuclear holocaust as well as unacceptable radioactive polution of the environment. The staggering cost of such developments, in order to provide acceptable levels of safety, continues to present an insurmountable barricade to satisying current energy needs. Likewise, acceptance of developments in the solar and/or geothermal energy conversion art has not advanced rapidly due to the relative inefficiency and high initial cost of these units, even though such thermal energy sources appear to be practically inexhaustable.

In addition, according to the present state of the art, the theoretical efficiency of any conventional thermal engine cannot be greater than that obtained for the Carnot Cycle. Thus the theoretical maximum efficiency is $1 - T_c/T_h$, where $T_h$ and $T_c$ are the absolute temperatures of the available heat source and sink respectively. It has been recognized that any method or cycle which is claimed to give high conversion efficiencies with low temperature differentials must operate at low temperature levels, i.e., near absolute zero. As a result of this apparent limitation, there has not been developed a thermal engine exhibiting efficiencies approaching those found in Nature, such as animal metabolisms, plant photosynthesis, and non-living phenomenon exemplified by atmospheric storms, etc.

SUMMARY OF THE INVENTION

The present invention overcomes the limitations of conventional thermal engines by providing a method and apparatus for converting thermal energy to rotational energy at efficiencies approaching 100% with small temperature gradients which can be produced by natural or manufactured thermal sources. By using small temperature gradients, energy losses are reduced since the heat disipated to the surroundings will be mminimized and the virtual work within the engine components (due to thermal stresses) will also become negligible. In addition, the direct utilization of natural energy sources, for example, solar, geothermal, etc., will become practical and competitive with converters using fossil or nuclear fuels, with the additional advantage of providing inexhaustable energy without the resulting thermal, chemical or radioactive polution.

The principle of operation of the present invention can be best understood by reference to a specific embodiment. In this embodiment, a hollow ring containing fluid is affixed at a distance to a shaft such that the shaft axis is parallel to the axis of the ring. The ring is rotated about the shaft to create a centrifugal field which acts upon the fluid within the ring. The leading half of the ring is exposed to a cool ambient while the trailing half of the ring is exposed to a warm ambient, thereby creating a small temperature difference across the ring and consequently a continuous difference of density of the fluid within the ring. Since the fluid occupying the leading half of the ring is denser than that occupying the trailing half of the ring, the denser fluid contains a greater amount of fluid mass. The rotation of the ring together with the varying density of the fluid within the ring, causes forces to act upon the fluid. One force is tangential to the ring center line and causes circulation of the fluid within the ring. The other force is normal to the ring wall and acts in the same direction as the ring rotation. This latter force causes a net moment to act upon the shaft which aids the original rotation of the shaft. Such net moment of torque can then be extracted from the shaft to do useful work. Once the fluid containing ring is brought to its optimum rotational velocity in the presence of a suitable temperature gradient, the rotation of the system will be self sustaining and will produce useful work from any type of available thermal energy source. In order to increase the efficiency of the thermal engine, multiple stages can be used in series. Likewise, to increase the power output of the engine, a plurality of stages may be used in parallel.

BRIEF DESCRIPTION OF THE DRAWINGS

FIG. 3 is a fragmentary cross-sectional view of multiple fluid containing rings illustrating one type of heat sink connection.

FIG. 4 is a fragmentary cross-sectional view of multiple fluid containing rings illustrating an alternative type of heat sink connection.

FIG. 5 is a fragmentary plan view of the multiple ring arrangement of FIG. 3.

FIG. 6 is a fragmentary perspective view of a thermal engine employing the inventive principle of the present invention.

DESCRIPTION OF THE PREFERRED EMBODIMENTS

Figure 1:
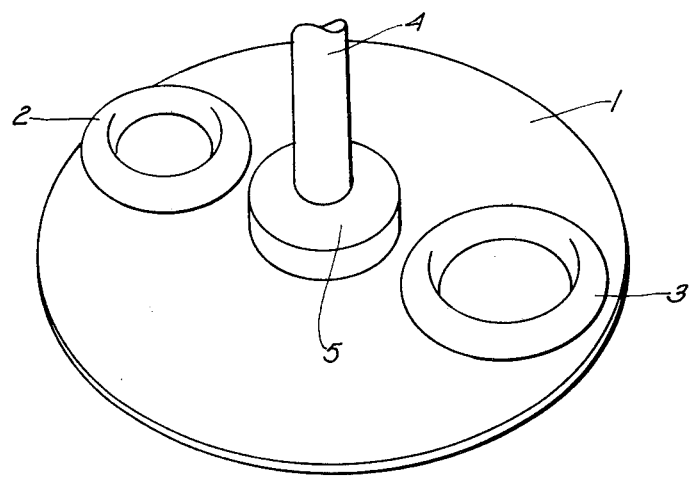
FIG. 1 is a fragmentary perspective view of apparatus employing the method of the present invention.

FIG. 1 illustrates a perspective view of apparatus employing the inventive principle of the present invention. A flat plate-like disc 1 fixedly supporting a pair of diametrically opposed hollow toroidal ring conduits 2 and 3 is nonrotatably attached to a central shaft 4 by means of a suitable coupling 5, such that disc 1 is free to rotate about the central axis of shaft 1. Rings 2 and 3 are filled with a suitable fluid, as will be described in more detail hereinafter. It will be observed that when disc 1 is rotated about the central axis of shaft 4, the fluid contained within rings 2 and 3 will be subject to a centrifugal force field.

Figure 2:
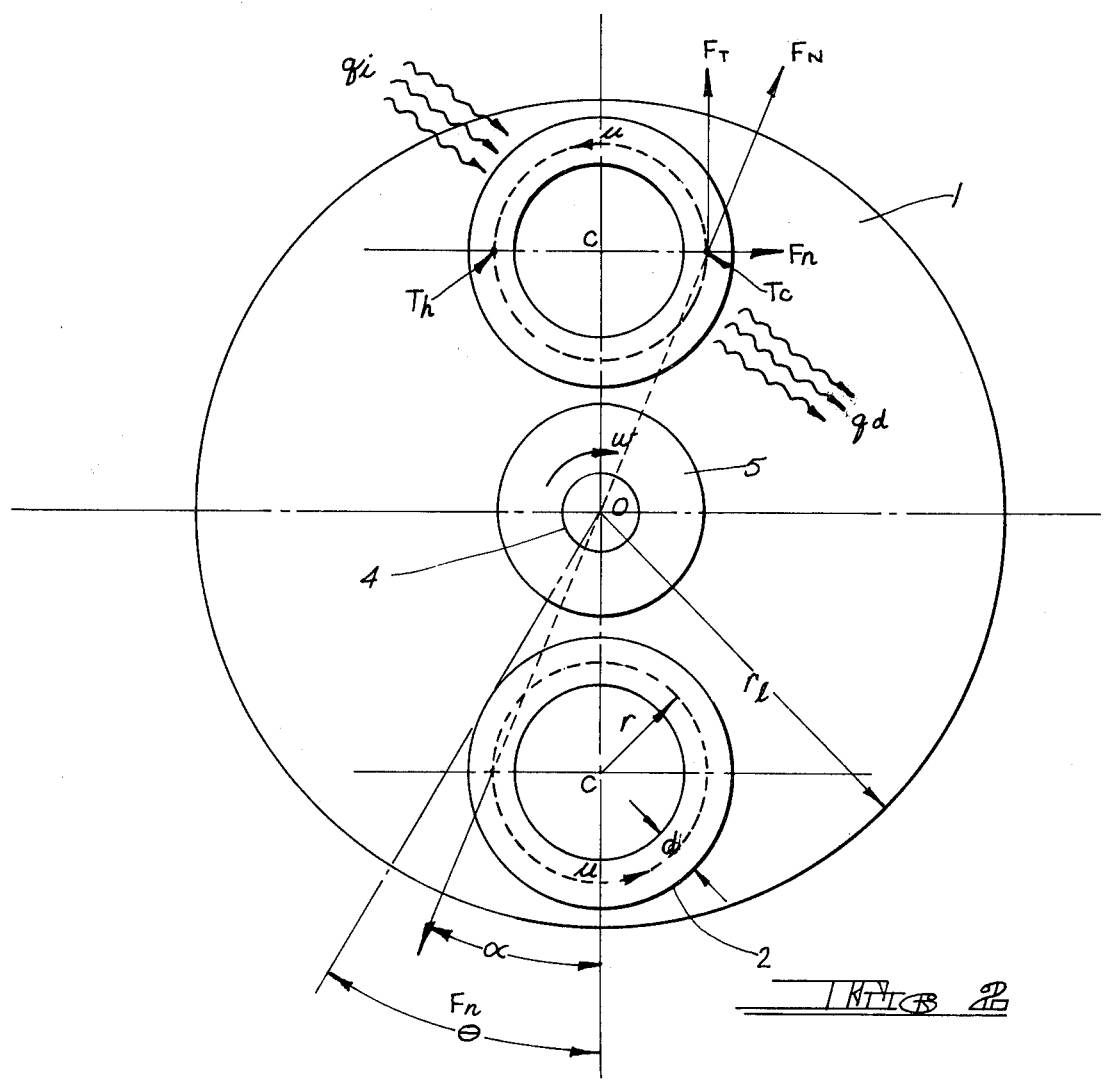
FIG. 2 is a schematic plan view of the apparatus shown in FIG. 1.

Turning to FIG. 2, the equations defining operation of the present invention will now be defined. It is initially assumed that the disc and rings have been given an angular velocity $w$ (RAD/SEC), which for purposes of illustration has been arbitrarily shown to be in a clockwise direction, as indicated by the arrow. It is further assumed that both rings shown are filled with the same type of fluid whose characteristics are determined by $\rho$ (density in LBS/ft.$^3$), $C_p$ (BTU/Lb − °F), $Pr$ (Prandlt No.), $v$ (kinematic viscosity, ft.$^2$/sec.), and $b$ (volumetric coefficient of thermal expansion, 1/°F). If the rings 2 and 3 have the same internal diameter $d$(ft.), radius of curvature $r$(ft.), and are at the same distance from the axis of rotation 0 of shaft 4, the lines connecting the points where the equators of the rings intersect their center lines and drawn through the center of rotation 0 will be equal and form the same angle $\alpha$ (radians) with the line connecting the axis of the respective rings. There is also provided means to introduce heat $q_i$ to the trailing portion of each ring as is shown in FIG. 2 as well as means to remove heat $q_d$ from the leading portion of each ring in such a way that during normal operation a maximum warm temperature $T_h$ (°F) will occur at the trailing equatorial point of each ring, and a corresponding minimum cool temperature $T_c$ (°F) will occur at the leading equatorial point. The temperature differential between the leading and trailing equatorial points is thus $t = T_h - T_c$.

As a result of the temperature differential resulting across each ring, the fluid within the ring will exhibit a continuous difference of density throughout the ring. That is, the fluid contained within the leading portion of the ring will exhibit a greater density than the fluid contained in the trailing portion of the ring. The rotation of the disc 1 of which rings 2 and 3 are a part will act upon the differing density of the fluid within the rings to produce a net force $F_N = F_c - F_h$, where $F_c$ and $F_h$ are the centrifugal forces of the fluid masses at the cooler and warmer portions of each ring, respectively. This relationship can be written as:

$$F_N = \frac{\pi^2 r^2 D^2 w^2 bt}{8 g \sin\alpha} \tag{1}$$

where $g = 32.2$ ft/sec.$^2$

Since the rings 2 and 3 are diametrically opposed, the respective forces $F_N$ cancel each other, causing no imbalance on the shaft 4. It will also be understood that the force $F_N$ of each ring can in turn be represented by two components, one normal to the ring wall $F_N$ and the other tangential the ring center line, where $F_N = F_N \sin\alpha$ and $F_T = F_N \cos\alpha$. Taking moments $M_n$ and $M_t$ with respect to the center of rotation O of disc 1, there obtains for each ring $|M_n| = |M_t| = F_N r \cos\alpha$. Since $M_n$ acts in the same direction as the rotation w of the system, which is considered to be positive, and $M_t$ acts against the direction of rotation, and thus is treated as a negative quantity, the sum of the two moments with respect to the shaft axis O would be 0 if both were to be acting on a point solidly connected to the axis.

The moment $M_n$ which acts normal to the ring wall contributes totally to a torque on the shaft axis O. The force produced by moment $M_t$ is partially used by the fluid within the ring, which gives rise to a counterclockwise circulation of the fluid with a relative velocity $u$ (ft./sec.) with respect to the ring wall, and partially by the drag of the fluid against the ring wall. The net power represented by these moments or torques is $$q_i = 2F_N r\omega \cos\alpha, \tag{2}$$

which represents the rate of thermal energy received by the ring that gives rise to the force $F_N$ in the presence of a centrifugal field and thermal gradient $t = T_h - T_c$. This force can be expressed as shown in equation (1) described hereinbefore. Since $F_r$ acts in the same direction as the rotation of disc 1, the power resulting from this force, i.e. $p_n = M_n w$, contributes to maintain the rotation. The effect of $F_t$, on the other hand, depends on the friction coefficient associated with the fluid flow within the ring. This friction coefficient can be defined as $f_c = F_f/F_t$, where $F_f$ is the frictional force or drag of the fluid against the ring wall. It can be shown that the efficiency equals $p_u/q_i = \frac{1}{2}(1-f_c)$, where Pu is the useful power transmitted to the shaft. Thus it is clear that the energy conversion efficiency of any single ring or circuit, regardless of the dimensions or the working fluid chosen, can only approach, but never attain a value of 50%. It is also important to note that with the present invention the conversion efficiency is limited by the allowed frictional factor in the circuit or ring rather than by the ratio of the absolute temperatures $T_c$ and $T_h$, which applies to conventional thermal engines.

As is well known in the art, the frictional coefficient is $f_c = fL/d$, where $f$ is the friction factor depending on the Reynold's number and $L$ is the length of the flow path. The Reynold's number may be defined as Rey = $ud/v$, in which $u$ is the mean velocity of the fluid, $d$ is the hydraulic diameter of the passage, and $v$ is the kinematic viscosity of the fluid. As is well known, if the Reynold's number is equal to or less than 2300, the flow will be laminar; however, if the Reynold's number is greater than 4000, the flow will be turbulent. In between these values, the flow is in transition between laminar and turbulent flow and will produce erratic values of $f$. For laminar flow, $f = 64$/Rey, while for turbulent flow in smooth passages $f = 0.2$/Rey$^{.20}$. Thus it can be seen that in order to minimize the friction factor, it is preferable that the flow region chosen be turbulent with a Reynolds number as high as possible. To obtain a high Reynold's number, it is desirable to keep $v$, the kinematic viscosity of the fluid, as small as possible. This will result if the fluid is in the liquid state. Thus it is preferred that the fluid in the present invention be at all times in the liquid state and its flow turbulent. This result is directly opposed to most conventional thermal engines wherein the fluids chosen are gases. The hydraulic diameter of the passage is selected primarily on the amount of power to be converted and the space allowed for the conversion device. The mean velocity $u$ of the fluid is affected by the temperature differential available for the circuit and also by the properties of the fluid chosen within the ring.

It can be shown that the mean velocity of the fluid is given by:

(3) $u = (2C_p gtJ)^{1/2}$ where $J$ is the mechanical equivalent of heat, and $C_p$ is specific heat of the fluid. Thus it is apparent that the present invention requires that the temperature differential in the circuit, i.e. $t = T_h - T_c$, be greater than 0. It is clear from this conclusion that the present invention complies with the Second Law of Thermodynamics. However, the present invention departs from the currently held assumption that a high ratio of the sink and source temperatures is necessary to obtain high conversion efficiencies. It can be shown that $$\text{efficiency} = \frac{1}{2}(1 - K/r^1), \text{ where:} \tag{4}$$

$$K = \frac{.5862}{(g \times J)} \cdot \frac{x \, r}{1 d^{1.2}} \times \frac{v^2}{C_p^1}$$

From this expression it is clear that the efficiency of the conversion has a stronger dependence upon the ratio $r/d$ than on the fluid properties or the temperature difference, $t$. It is also clear that in any single circuit or ring the efficiency can approach but not attain 50%. It can also be shown that, in order to optimize the overall efficiency and power output for a given temperature difference, $t$, that it is desirable that each circuit or ring have an efficiency of 25%. However, it will be further understood that several of the rings or circuits may be connected together in such a way that the heat discarded by one ring or circuit becomes the heat source for the next ring or circuit; i.e., the circuits are thermally in series; under this condition, it can be shown that the overall efficiency of the entire thermal engine will be (5) efficiency $= 1 - 0.75^n$, where $n$ represents the number of circuits thermally in series (conversion stages).

The total useful power of the engine can be increased by connecting a number of circuits or rings thermally in parallel, producing a "stage" of the engine. In order to optimize the power produced by a given stage consisting of a number of circuits in parallel, it can be shown that for equal size rings each succeeding stage should have $\frac{3}{4}$ of the number of circuits of the preceeding stage. Thus, for example, in a thermal engine having 16 circuits or rings in the first stage, the second stage will contain 12 circuits, the third stage will contain 9 circuits, etc.

One technique by which individual rings or circuits may be connected thermally in parallel or series is illustrated in FIG. 3. A first stage, shown generally at 10, contains 5 rings or circuits 2a thru 2e, although any number of rings or circuits may be used. The rings 2a thru 2e are stacked vertically with adjoining ring surfaces in physical and thermal contact. It will be understood in FIG. 3 that stack 10 rotates in a direction such that the left-hand or cooler portion of rings 2a thru 2e leads the right-hand or warmer portion of the rings. To insure maximum transfer of heat between all rings forming the leading portion of stack 10, the leading portion of rings 2a thru 2e may be joined by thermal conducting member 7, which may comprise a thermally conductive sheet of material attached to the rings by soldering, welding, or the like, or may comprise a thermally conductive compound, such as a silicon-based heat conducting compound or similar material. It will further be understood, that the leading portion of rings 2a thru 2e may be joined directly by welding, soldering, or the like, or the entire stack 10 may be constructed in such a way as to insure maximum heat transfer between adjoining ring members. The trailing or warmer portion of rings 2a thru 2e are joined in a similar manner by thermally conductive member 6. Thermally conductive members 6 and 7 may extend any distance around their respective portions of rings 2a - 2e, or may form a continuous thermally conducting member. The thermally conducting members 6 and 7 may be solid or formed from strips, webs, or the like.

Stack 10 is surmounted by a flat circular thermally conducting member 8 which may overlie the entire stack and is thermally connected to conductor 6 as it is best seen in FIG. 3. It will be understood that thermal radiation impinging upon member 8 will be transmitted through conductor 6 to the warm or trailing portion of the rings forming stack 10. Thermally conducting member 8 may be constructed of copper, aluminum, or any similar heat conducting material. The upper surface of member 8 may be darkened, textured or contain fins or the like in order to increase the absorbence of impinging thermal radiation. A thermal insulator 9 is provided between conducting member 8 and upper ring 2a to prevent heat transfer from member 8 to the cooler portions of the rings forming stack 10. Insulating material 9 may completely overlie ring 2a, or may be constructed in such a shape as to overlie only the cooler portion of the rings forming stack 10. Additional stacks, such as that indicated generally at 11, and composed of rings 2f thru 2j, may also be constructed in a similar manner. Such stacks may be joined together so as to place the stacks thermally in series by thermally conducting member 13. As can be seen in FIG. 3, thermally conducting member 13 is attached at its upper end to conductor 7 (which connects the cooler portions of the rings forming stack 10 as described hereintofore), and at its lower end to conductor 14 (which connects the warmer portions of the rings forming stack 11 in a manner similar to that described hereintofore for conductor 6 connecting the warmer portion of rings 2a thru 2e of stack 10). This arrangement permits the thermal energy not utilized by a stack to be fully used by subsequent stacks. It will be understood that as many stacks as is required may be connected thermally in series in a similar manner. Insulator 15 is provided between stacks to prevent improper heat transfer between stacks, such as that shown at 11. Insulator 15 may be supported by shaft 4 as shown in FIG. 3, or may be supported by the stacks themselves as required in a particular application.

The cooler portion of the lowermost stack, such as depicted in FIG. 3 as portion 16 of stack 11, is thermally connected to a heat sink representing the lowest temperature in the system. For purposes of an exemplary showing, the cooler portion of rings 2f thru 2j of stack 11 are shown connected together by a suitable thermal conductor 17, similar in nature to conductor 7 of stack 10, which in turn is connected by thermal conductor 18 to thermally conductive shaft 4. The connection of conductor 18 to shaft 4 may be accomplished by any suitable means such as welding, soldering or the like. Shaft 4 may then act as a conductor to transfer heat to a suitable sink. FIG. 4 shows an alternative embodiment of FIG. 3 where individual thermal conductors 18a thru 18e are connected to shaft 4 in a manner similar to the single conductor 18 of FIG. 3. It will be understood that thermal connecting member 17 may be omitted in either of the embodiments of FIG. 3 or FIG. 4 and the thermal connection made directly between the rings and the shaft by conductor 18.

FIG. 6 shows a typical thermal engine using stacks 20a thru 20d of the present invention. Each stack is attached to the cruciform support 21 which is in turn nonrotatably attached at its center by shaft 4. Each stack consists of five rings connected in a manner similar to stack 11 of FIG. 3. For example, the leading portion of the rings of stack 20d are connected by thermally conducting member 22 which is in turn attached to arm 21a of support 21 to provide a heat transfer path to shaft 4. The trailing or warmer portion of the rings forming stack 20d are interconnected by a heat conducting member 23 similar to the heat conducting member 14 of stack 11 as hereinbefore described in connection with FIG. 3. In addition, stack 20d is surmounted by heat conducting plate 24 which is connected to conducting member 23 in a manner analogous to plate 8 and conducting member 6 of stack 10 as shown in FIG. 3. It will be understood that stacks 20a thru 20c are constructed in a similar manner. All moving parts of the engine may be shaped appropriately or provided with suitable shields to provide efficient aerodynamic characteristics. Alternatively the engine may be operated in an evacuated chamber for reduced air resistance on moving parts.

Shaft 4 is rotatably attached to main load mounting 25 which in turn is rigidly attached to arm 26a of support 26, which is firmly attached to the ground or other supporting structure (not shown). Main load mounting 25 provides most of the axial support for shaft 4 and also contains a motor/generator (not shown) of any suitable type. When in the driving mode, as will be described hereinafter, the motor rotates shaft 4 in the direction shown by arrow 27. In the driven mode, the motor functions as a generator to provide electrical power from the rotational energy produced by the thermal engine. The lower end of shaft 4 is supported by a bearing 28 which prevents lateral movement of the shaft, as well as provides a suitable bearing surface for the end of shaft 4. Bearing 28 is so constructed as to provide minimal resistance to heat transferred from the cooler portions of the rings forming stacks 20a thru 20d, through the arms of support 21 and shaft 4 to sink 30. It will also be understood that the lower portion of shaft 4 will have a cross sectional area that will give a low thermal resistance. Heat conducted through bearing 28 is transferred to fixed support 29 and distributed over heat sink 30, which may be located below ground level in order to utilize the constant subterranean ambient temperature as a heat sink. It will be understood that heat sink 30 may comprise other types of sinks such as a flowing fluid, etc.

The quantity of thermal energy reaching the thermal engine may be controlled by suitable shutters or vanes such as illustrated in FIG. 6 at 31. It will be understood that varying the pitch of vanes 31, either manually or automatically, will vary the amount of thermal energy reaching the thermal engine and consequently the amount of power produced by the apparatus. Other appropriate means may also be employed to direct thermal energy to the thermal engine, such as lenses, mirrors, conduits, etc. Any source of thermal energy may be used. For example, solar energy, geothermic energy, or waste heat from combustion reactions are but a few of the types of sources which may be utilized.

Each ring forming stacks 20a–20d is filled with a suitable working fluid, which may be introduced into the ring by means of a suitable valve, one of which is shown at 32 in connection with stack 20d.

In operation, the motor contained within main load mounting 25 is energized to provide an initial impetus to shaft 4 in the direction shown by arrow 27. The motor is selected such that the apparatus will attain an angular velocity near the design rotational velocity $w$, which can be calculated from the equations discussed heretofore as:

$$w = \frac{2}{5}(2gJ)^{2/5}\pi^{2/3}\frac{C_p^{2/5}v}{b^{1/3}}\frac{1/5_t \cdot 0667}{d^{6/5}}tg\alpha^{1/3} \qquad (6)$$

Once the thermal engine has reached a rotational velocity near this speed the rotation will be self-sustaining provided sufficient thermal energy is impinging upon the collecting discs surmounting each stack of rings. The motor may be disengaged when the thermal engine becomes self sustaining and used as a generator to provide electrical power from the engine. If the load on the generator is held constant, the speed of the engine will vary with the amount of energy reaching the collecting discs. Thus in order to provide a constant output from the generator, it may be necessary to vary the amount of energy reaching the engine by adjusting vanes 31. This process may be accomplished automatically by means of a suitable feedback control system. It will also be observed that the engine will tend to speed up or slow down depending on changes in the electrical load. This condition can be corrected by again adjusting the amount of energy reaching the collecting discs by varying vanes 31 to maintain a constant engine rotational velocity.

For purposes of an exemplary showing, a simple thermal engine of the single stage type will be described using two stacks consisting of one ring or circuit per stack with mercury as the working fluid. The working parameters of the thermal engine are as follows:

Table I $\rho = 847$ Lb/ft$^3$
$C_p = 1/30$ BTU/lb.°F
$Pr = 1/40$
$v = 1.23 \times 10^{-6}$ ft$^2$/sec.
$b = 1.01 \times 10^{-4}$ F$^{-1}$
$w = 816$ rad/sec.

It will be noted from Table I that the temperature differential of each ring is 0.1252° F. The actual temperature differential between the collecting disk and the heat sink 30 may, in a crude device, be 35 times as large, or 4.382° F. Using the equations shown hereinbefore, the power transmitted to the shaft of the engine can be calculated to be approximately 100ft - lbs/sec. per ring or approximately ⅕ horsepower. It can be shown that a conventional engine using such a small temperature differential would give an overall efficiency of approximately ¾ percent, whereas the present invention gives a constant efficiency of 25%, since a single stage is being utilized.

It will be understood that various changes in the details, materials, steps and arrangements of parts, which have been herein described and illustrated in order to explain the nature of the invention may be made by those skilled in the art within the principle and scope of the invention as expressed in the appended claims.

The embodiments of the invention in which an exclusive property or privilege is claimed are defined as follows:

1. A thermal engine for converting thermal energy to rotational energy comprising:
   a. means for containing a fluid comprising at least one fluid tight hollow ring-like conduit having a substantially constant cross-section defining a single closed continuous flow path for said fluid;
   b. means for subjecting said fluid to a centrifugal force field, said subjecting means comprising support means having a central shaft for rotating said conduit about said shaft in a plane substantially parallel to said flow path, said support means mounting said conduit so as to prevent relative movement therebetween; and
   c. means for impressing a thermal gradient across said fluid,
   whereby a density gradient is produced in said fluid which is acted upon by said centrifugal force field to produce a moment about said rotational axis by which rotational energy is transmitted to said shaft.

2. The thermal engine according to claim 1 wherein said conduit comprises a toroidal ring and said fluid containing means comprises at least one stack of said rings, each of said stacks containing at least one ring.

3. The thermal engine according to claim 2 including a plurality of said stacks joined by thermal conductors connecting said stacks thermally in series.

4. The thermal engine according to claim 2 wherein said stacks are located at points equidistant from said shaft.

5. The thermal engine according to claim 2 wherein opposing sides of said rings in said stacks are joined by a thermal conductor placing said rings thermally in parallel.

6. The thermal engine according to claim 2 wherein the axis of said shaft is parallel to and displaced from the axis of said stack.

7. The thermal engine according to claim 6 including means for rotating said shaft until a desired rotational velocity is reached to produce a centrifugal force field in the vicinity of said fluid, whereby each of said stacks is given a leading and a trailing portion.

8. The thermal engine according to claim 2 wherein said means for impressing a thermal gradient across said fluid comprises:
   a. a thermal absorber surmounting each of said stacks;
   b. a thermal conductor connecting said absorber to a portion of said stack;
   c. a heat sink; and
   d. a thermal conductor connecting a different portion of said stack to said heat sink.

9. The thermal engine according to claim 8 including a thermal insulator between said absorber and said stack.

10. The thermal engine according to claim 8 including means for varying the amount of thermal energy reaching said absorber.

11. The thermal engine according to claim 7 including means for removing mechanical energy from said shaft after said desired velocity is attained.

12. The thermal engine according to claim 11 wherein said means for removing mechanical energy from said shaft comprises an electric generator.

13. The thermal engine according to claim 1 wherein said fluid comprises a liquid.

14. The method for converting thermal energy to rotational energy comprising;
   a. containing a fluid in a hollow ring-like conduit defining a single closed continuous flow path;
   b. subjecting said fluid to a centrifugal force field by rotating said conduit about a central axis such that said flow path is substantially parallel to the plane of rotation;
   c. impressing a thermal gradient across said fluid to produce a density gradient which is acted upon by said centrifugal force field to produce rotational energy at said shaft; and
   d. removing said rotational energy from said shaft.

15. The method according to claim 14 wherein said conduit comprises a toroidal ring.

16. The method according to claim 15 including a plurality of said rings in stacked relationship to form at least one stack of rings.

17. The method according to claim 16 wherein said shaft is rotated until a desired rotational velocity is reached to impart to each stack a leading and trailing portion.

18. The method according to claim 15 including the step of impressing a thermal gradient across the fluid by impinging energy upon a thermal absorber surmounting each stack, transferring said thermal energy to a portion of said stack, and removing thermal energy from a different portion of said stack to a heat sink.

19. The method according to claim 18 wherein the quantity of thermal energy impinging on said absorber may be varied.

20. The method according to claim 17 wherein said rotational energy is removed from said shaft after said desired velocity is attained.

21. The method according to claim 14 wherein the fluid comprises a liquid.

* * * * *